D. McKenzie,
Baker's Oven,
No. 3,929. Reissued Apr. 19, 1870.
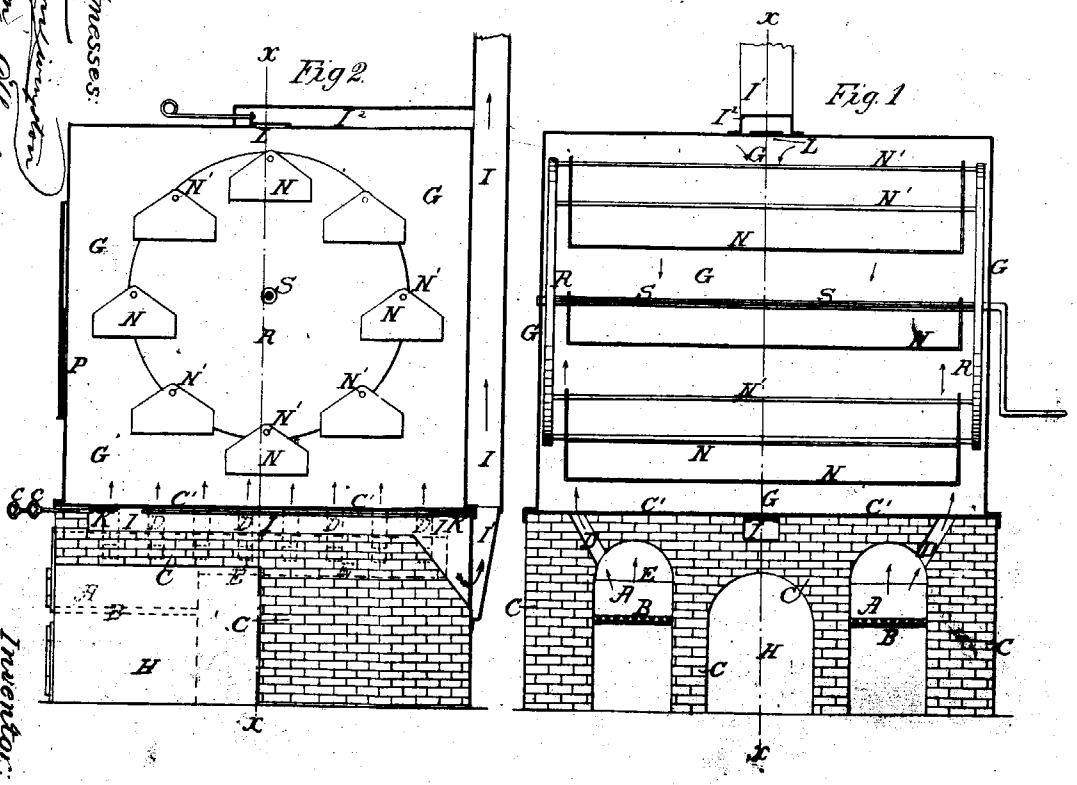
Witnesses:
M. Livingston
Wm. Thompson
Inventor:
Duncan McKenzie

United States Patent Office.

MARY ANN ELIZABETH McKENZIE, OF BROOKLYN, NEW YORK, ASSIGNEE OF DUNCAN McKENZIE.

*Letters Patent No.* 28,130, *dated May* 1, 1860; *reissue No.* 3,929, *dated April* 19, 1870.

BAKER'S OVEN.

The Schedule referred to in these Letters Patent and making part of the same

*To all whom it may concern:*

Be it known that I, MARY ANN ELIZABETH McKENZIE, of Brooklyn, in the county of Kings and State of New York, am the grantee of Letters Patent No. 28,130, dated May 1, 1860, for certain new and useful Improvements in Baking-Ovens, invented by DUNCAN McKENZIE, of Brooklyn aforesaid; and I do hereby declare that, to the best of my knowledge and belief, the following is a full, clear, and exact description of the said invention, reference being had to the accompanying drawing forming part of this specification, and in which—

Figure 1 represents a transverse vertical section of an oven constructed according to the invention, taken in the plane indicated by the line *x x* in Figure 2, which is a vertical longitudinal section, taken through the oven in the plane indicated by the line *x x* in fig. 1.

This invention relates to ovens in which the bread or other substance is baked by the direct contact of the gaseous products of combustion from the fire or fires, the fuel used being anthracite coal or other fuel, from the combustion of which very little or any smoke is evolved.

The invention consists in the arrangement of flues, communicating from the fire-place or fire-places with the oven directly through the floor of the latter, instead of by flues entering through the sides of the oven, as in ovens previously constructed to bake by the direct contact of the gaseous products of combustion.

By this improvement the construction of the oven is simplified, and it is rendered more economical of fuel.

The invention further consists in certain arrangements of exit-flues and dampers, for securing a proper circulation of the gaseous products of combustion through the oven, both in baking and in lighting the fire.

The oven represented has two fire-places, but the number is immaterial to the invention.

A A are fire-places built up with brick-work C of arched form, with their grates B B and ash-pits extending back a suitable distance from the front, as represented in dotted lines in fig. 2, and with an arched coal-receptacle, H, between them.

From the backs of each fire-place a bed, E, of brick-work is built up, extending to the rear wall of the oven, and forming, with the continuation of the fire-place, a horizontal space or flue, extending to the rear of the oven.

The brick is all leveled on the top, to form the floor of the oven, and the floor may be covered with a plate, C', of metal.

D D are a series of flues which lead off from the fire-places and the spaces over the beds E, and communicate directly, through the floor C C', with the interior of the oven G, which is arranged above the masonry.

These short flues are the only means of escape for the gaseous products of combustion from the fire-places, and also of the heat from the furnace, except what little will be absorbed and given out by radiation from the brick-work above the arch into the oven, and they (the flues) are sufficiently numerous to allow of the free and rapid passage of the gaseous products of combustion from the fire-places directly into the oven, and their diffusion through the oven.

Between the two furnaces, and extending from the front to the rear of the oven, directly under the floor thereof, is a horizontal flue, I, which communicates with a vertical flue, $I^1$, extending up in rear of the oven, as shown by fig. 2, and forming or leading to the chimney.

The horizontal flue I communicates with the oven through holes in its front and rear, which are closed by valves K K, fig. 2, which can be operated from the front of the oven by means of damper-rods *c c*.

This flue I is the exit-flue by which the gaseous products of combustion escape from the oven, through the openings of the valves K K.

The rear end of the flue I, which communicates with the flue $I^1$, is enlarged into a chamber and bent downward, somewhat in the form of an inverted cone.

The point of communication with the flue $I^1$ is at the lower part of this chamber.

By this enlargement and downward projection of flue I the draught of flue $I^1$ acts equally upon the contents of flue I, drawing off the same more evenly and freely than if the flue I were continued horizontally out and opened directly into flue $I^1$.

If the flue I were extended horizontally as stated, the draught through the damper-opening at the back end of flue I would be greater than the corresponding opening at the opposite end; but by the enlargement and downward extension of the rear end of the flue I the draught through both damper-openings K is rendered uniform, and the baking operation thus improved and the fuel saved.

In the center of the top of the oven is a valvular opening L, which communicates with the main flue $I^1$ by a horizontal flue, $I^2$, as clearly represented by the drawings.

In the oven G are arranged a suitable number of gravitating-pans or shelves N, which are hung from a reel composed of rods N, extending across between two circular revolving plates E E, which are turned by a shaft, S, having its bearing in each side of the oven.

The bread-pans are placed on these swinging shelves

N, and the whole number are caused to revolve at one time by turning the shaft S. The bread on all the shelves is thus made to receive a uniform heat.

The bread-pans are placed in and removed from the oven through door P, fig. 2.

When the fires are built up in the furnaces, and the damper in the top of the oven opened, a direct-ascending draught will take place, and the smoke and gases of combustion will all escape through the flue $I^2$, but when the fires are well lighted this damper should be closed, and either or both of the dampers K K in the lower central and horizontal flue I may be opened or partially opened, when a downward draught will take place, and the heated air and gaseous products which enter the oven directly from the fire-places by the flues D will rise to the top of the oven on the sides, and then descend in the center of the oven to the central flue I, and escape thence up the main flue $I^1$. The heated air and gases will thus be made to circulate and rotate in the oven, and diffuse their heat through the entire oven in a uniform and rapid manner.

I am aware that the products of combustion have heretofore been passed through a reel-oven. I therefore do not claim this feature broadly; but

What I claim as the invention of DUNCAN MCKENZIE is—

1. A system of flues communicating between the fire-places and the interior of the oven, directly through the floor or bottom of the latter, substantially as herein described.

2. The combination of the flues D, escapes K K, and flue I, in the lower part or floor of the oven C, and for the purpose herein shown and described.

3. The enlargement and downward extension of the rear end of flue I, in combination with flue $I^1$, as and for the purpose herein shown and described.

4. The arrangement, in combination with the oven G, of the flues $I^2$, $I^1$, I, D, and the dampers K K and L, as and for the purpose herein shown and described.

M. A. E. MCKENZIE.

Witnesses:
DAVID BARNETT,
J. N. FOOTE.